(12) United States Patent
Brown et al.

(10) Patent No.: US 8,811,674 B2
(45) Date of Patent: *Aug. 19, 2014

(54) INCORPORATING VIDEO META-DATA IN 3D MODELS

(71) Applicant: International Business Machines Corporation, Armonk, NY (US)

(72) Inventors: Lisa M. Brown, Pleasantville, NY (US); Ankur Datta, White Plains, NY (US); Rogerio S. Feris, White Plains, NY (US); Sharathchandra U. Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/065,593

(22) Filed: Oct. 29, 2013

(65) Prior Publication Data

US 2014/0056476 A1 Feb. 27, 2014

Related U.S. Application Data

(63) Continuation of application No. 13/890,339, filed on May 9, 2013, now Pat. No. 8,630,460, and a continuation of application No. 13/101,401, filed on May 5, 2011, now Pat. No. 8,457,355.

(51) Int. Cl.
*G06K 9/00* (2006.01)
*H04N 5/225* (2006.01)

(52) U.S. Cl.
USPC ............................................ 382/103; 348/169

(58) Field of Classification Search
USPC ............ 382/103, 107, 154, 236; 348/94, 152, 348/154, 155, 169–172, 208.1, 208.2, 348/208.16, 352, 353, 465; 345/419, 420, 345/474, 633; 703/2; 725/12, 15
See application file for complete search history.

(56) References Cited

U.S. PATENT DOCUMENTS

| 7,583,275 B2 * | 9/2009 | Neumann et al. ............. 345/633 |
| 2010/0194863 A1 | 8/2010 | Lopes et al. |
| 2010/0208942 A1 | 8/2010 | Porter et al. |
| 2010/0220891 A1 | 9/2010 | LeFevre et al. |
| 2011/0058709 A1 | 3/2011 | Kipman et al. |

OTHER PUBLICATIONS

Ismail Oner Sebe et al, 3D Video Surveillance with Augmented Virtual Environments, Integrated Media Systems Center, 2003, 6 pp., ACM.

International Search Report issued Aug. 9, 2012 by the Canadian Intellectual Property Office re PCT Application of International Business Machines Corporation, No. PCT/CA2012/050288, filed May 2, 2012.

(Continued)

*Primary Examiner* — Abolfazl Tabatabai (74) *Attorney, Agent, or Firm* — Patrick J. Daugherty; Driggs, Hogg, Daugherty & Del Zoppo Co., LPA (57) ABSTRACT

A moving object tracked within a field of view environment of a two-dimensional data feed of a calibrated video camera is represented by a three-dimensional model. An appropriate three-dimensional mesh-based volumetric model for the object is initialized by using a back-projection of a corresponding two-dimensional image. A texture of the object is projected onto the three-dimensional model, and two-dimensional tracks of the object are upgraded to three-dimensional motion to drive a three-dimensional model.

20 Claims, 3 Drawing Sheets

(56) References Cited

OTHER PUBLICATIONS

U.S. Appl. No. 13/101,401, filed May 5, 2011.
Notice of Allowance (Mail Date Dec. 28, 2012) for U.S. Appl. No. 13/101,401, filed May 5, 2011.
Statement, RCE and IDS After Allowance (File Date Jan. 8, 2013) for U.S. Appl. No. 13/101,401, filed May 5, 2011.
New Notice of Allowance (Mail Date Feb. 6, 2013) for U.S. Appl. No. 13/101,401, filed May 5, 2011.
U.S. Appl. No. 13/890,339, filed May 9, 2013.
Non-Final Office Action (Mail Date Jul. 15, 2013) for U.S. Application No. 13/890,339, filed May 9, 2013.
Response and Terminal Disclaimer (File Date Jul. 16, 2013) to Non-Final Office Action (Mail Date Jul. 15, 2013) for U.S. Appl. No. 13/890,339, filed May 9, 2013.
Notice of Allowance (Mail Date Sep. 4, 2013) for U.S. Appl. No. 13/890,339, filed May 9, 2013.

\* cited by examiner

INCORPORATING VIDEO META-DATA IN 3D MODELS

RELATED APPLICATIONS

This application is a continuation of U.S. application Ser. No. 13/890,339, filed May 9, 2013, which is a continuation of U.S. application Ser. No. 13/101,401, filed May 5, 2011, now U.S. Pat. No. 8,457,355 B2, issued Jun. 4, 2013.

BACKGROUND

The present invention relates to creating an Augmented Virtual Environment (AVE) that augments two-dimensional (2D) video data with three-dimensional (3D) understandings of objects contained within the video data environment.

Understanding and determining the import of the various object movements, for example a person approaching an area or taking some sort of action that exposes that person or others to a heightened hazard risk, may be difficult from 2D video data streams. Human operators may be required to simultaneously review and analyze multiple monitors or display windows for object movements, and the 2D nature of video data may make object recognition and tracking by the human eye difficult, particularly in visually rich or noisy environments.

Object tracking and recognition may be improved if 2D video data is provided in an Augmented Virtual Environment (AVE) that creates 3D scene models of objects present in the video data, as recognizing and tracking 3D objects is inherently more intuitive to human observers. However, to adequately render 3D models such systems require other data inputs, for example data from other cameras or other devices, such as range, image and/or object tracking sensors.

BRIEF SUMMARY

In one aspect of the present invention, a method represents objects tracked within 2D video data within a field of view environment of a 2D data feed of a calibrated video camera by 3D models. The camera is calibrated to place the camera within a position context of a 3D model of the environment of the camera field of view. A 3D mesh-based volumetric model appropriate for the tracked object within the spatial context of the 3D model of the environment is initialized by using a back-projection of a corresponding 2D image of the tracked object. IN some aspects nonlinear dynamics of a tracked motion path of the object in the 2D image data are represented as a collection of different local linear models. A texture of the 2D object is projected onto the 3D model, and 2D tracks of the object are upgraded to 3D motion to drive the 3D model in dynamic mesh-based 3D, in one aspect by learning a weighted combination of the different local linear models that minimizes an image re-projection error of model movement.

In another aspect, a system has a processing unit, computer readable memory and a computer readable storage medium device with program instructions stored thereon that when executed cause the processing unit to localize a centroid of a moving object detected and tracked within a field of view environment of a 2D data feed of a calibrated video camera, and to determine an intersection of the centroid with a ground-plane within the field of view environment, wherein the camera is calibrated to place the camera within a spatial height, orientation and position context of a 3D model of the environment of the camera field of view. The processing unit is further caused by the program instructions to initialize a 3D mesh-based volumetric model appropriate for the tracked object within the spatial context of the 3D model of the environment by using a back-projection of a corresponding 2D image of the tracked object as a function of the centroid and the determined ground-plane intersection. In addition, the processing unit is also caused by the program instructions to represent nonlinear dynamics of a tracked motion path of the object in the 2D image data as a collection of different local linear models, project a texture of the 2D object onto the 3D model, and upgrade 2D tracks of the object to 3D motion to drive the 3D model in dynamic mesh-based 3D by learning a weighted combination of the different local linear models that minimizes an image re-projection error of model movement.

In another aspect, an article of manufacture has a computer readable storage medium device with computer readable program code embodied therewith, the computer readable program code comprising instructions that, when executed by a computer processor, cause the computer processor to localize a centroid of a moving object detected and tracked within a field of view environment of a 2D data feed of a calibrated video camera, wherein the camera is calibrated to place the camera within a spatial height, orientation and position context of a 3D model of the environment of the camera field of view. The instructions also cause the computer processor to determine an intersection of the centroid with a ground-plane within the field of view environment and initialize a 3D mesh-based volumetric model appropriate for the tracked object within the spatial context of the 3D model of the environment by using a back-projection of a corresponding 2D image of the tracked object as a function of the centroid and the determined ground-plane intersection. The instructions additionally cause the computer processor to represent nonlinear dynamics of a tracked motion path of the object in the 2D image data as a collection of different local linear models having a total number of the different local linear models that is optimized using a cross-validation system; project a texture of the 2D object onto the 3D model; and upgrade 2D tracks of the object to 3D motion to drive the 3D model in dynamic mesh-based 3D by learning a weighted combination of the different local linear models that minimizes an image re-projection error of model movement.

In another aspect, a method for providing a service for representing objects tracked within 2D video data by 3D models includes providing a centroid localizer that localizes a centroid of a moving object detected and tracked within a field of view environment of a 2D data feed of a calibrated video camera, and further determines an intersection of the centroid with a ground-plane within the field of view environment, wherein the camera is calibrated to place the camera within a spatial height, orientation and position context of a 3D model of the environment of the camera field of view. The method also provides a 3D modeler that initializes a 3D mesh-based volumetric model appropriate for the tracked object within the spatial context of the 3D model of the environment by using a back-projection of a corresponding 2D image of the tracked object as a function of the centroid and the determined ground-plane intersection. Said 3D modeler also represents nonlinear dynamics of a tracked motion path of the object in the 2D image data as a collection of different local linear models having a total number of the different local linear models that is optimized using a cross-validation system, projects a texture of the 2D object onto the 3D model, and upgrades 2D tracks of the object to 3D motion to drive the 3D model in dynamic mesh-based 3D by learning a weighted combination of the different local linear models that minimizes an image re-projection error of model movement.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical aspects or embodiments of the invention and, therefore, should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to aspects of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
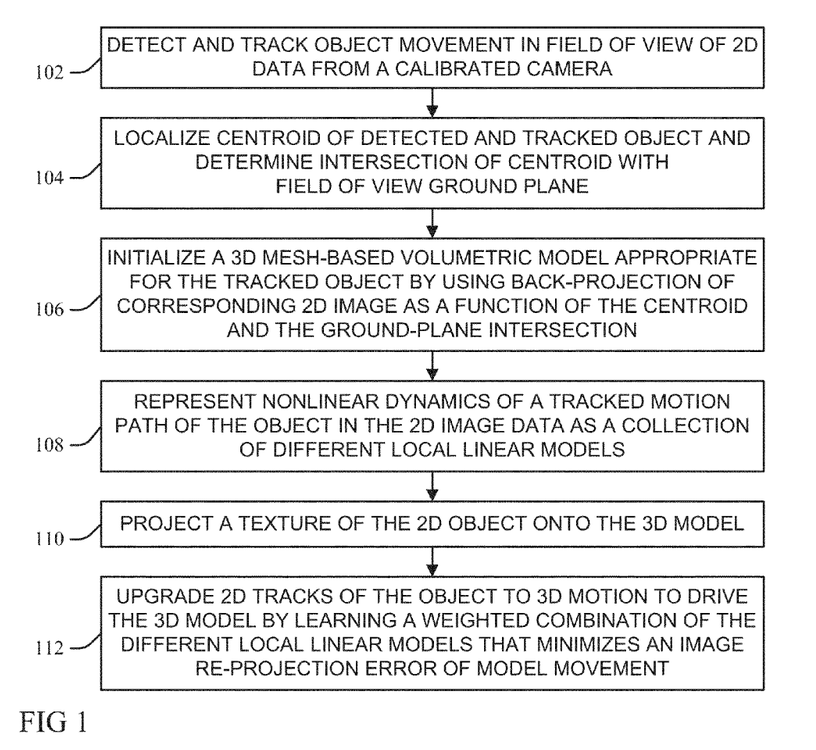
FIG. 1 is a flow chart illustration of an aspect of a method or system for representing objects tracked within 2D video data by 3D modeling according to the present invention.
Figure 2:
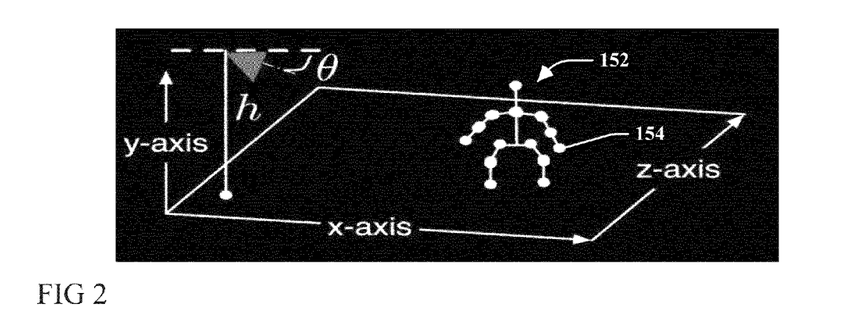
FIG. 2 is a diagrammatic illustration of a camera calibration according to aspects of the present invention.

Referring now to FIG. 1, an aspect of a method, process or system for representing objects tracked within 2D video data by 3D modeling according to the present invention is illustrated. More particularly, at 102 an object is detected and persistently tracked within the field of view environment of calibrated video camera 2D data feed. The video camera is calibrated to recover extrinsic camera parameters that place the camera within a spatial context of a 3D model of the environment of its field of view. Calibrating the camera determines the camera's height, orientation and position in the world plane using standard camera calibration techniques. For example, referring to FIG. 2, the height of a camera (h) from a ground plane and its angle of orientation (θ) with respect to the ground plane may be calibrated with respect to coordinates on x, y and z-axis's in a 3D representation of the environment of its field of view through use of a reference object 154 and its known or determined location coordinates. Camera calibration may also be performed through a variety of methods or systems, including by use of a checkerboard pattern, and other techniques will be apparent to one skilled in the art.

Object detection and tracking at 102 may be performed through a variety of object detector methods or systems, for example through optical flow techniques. Some aspects use detectors capable of detecting and distinguishing different object types from one another, for example people, vehicles, trucks, buses or other flora and fauna, etc. Movements of the detected objects are tracked across the field of view of the camera using an appearance-based technique, often one with capabilities under varying illumination conditions.

Figure 3:
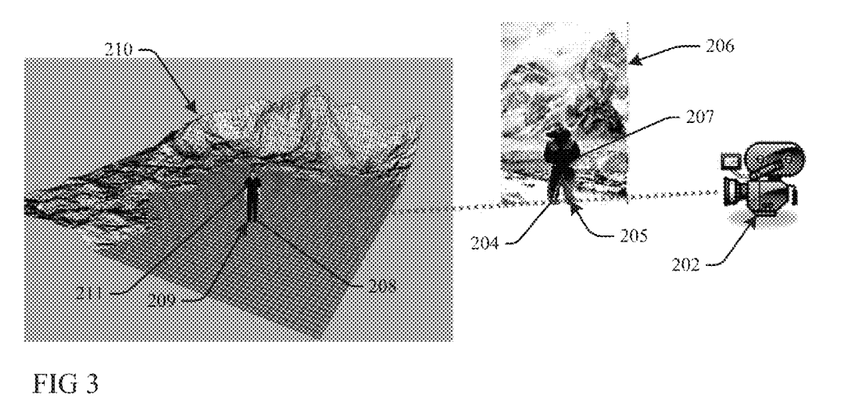
FIG. 3 is a diagrammatic illustration of a back projection modeling technique according to aspects of the present invention.

At 104 a centroid of the tracked object is effectively localized and the intersection of the centroid with a ground-plane in the images is determined. At 106 a 3D mesh-based volumetric model appropriate for the tracked object is initialized within the spatial context of the 3D model of the environment determined at 102. The initializing at 106 comprises populating the tracked object with the 3D mesh-based volumetric model within the spatial context of the 3D model of the environment by using a back-projection of the corresponding 2D image of the tracked object as a function of the centroid and ground-plane intersection data determined at 104. The back-projection is achieved using the calibration between the camera images and the 3D world model. For example, referring to FIG. 3, given the known position (P) 202 of the calibrated camera, one may back-project a pixel (x) 204 image location of the feet 205 of a person object 207 in the 2D image 206 of the environment of its field of view to a 3D location (X) 208 of the feet 209 of a 3D mesh-model 211 selected for use in representing the person 207 within a 3D world model 210 of the field of view environment according to equation [1]:

$$X = P^{-1}x, \quad [1]$$

where ($P^{-1}$) is the inverse of a three-by-four camera matrix. Thus, back-projecting the feet 205 of a person 207 from an image allows us to place the person in a 3D location in the world, and we can then place a 3D model 211 at that 3D location.

At 108 nonlinear dynamics of a tracked motion path of the object in the 2D image data are represented as a collection of different local linear models. Each local linear model encodes the nonlinear dynamics in a small-neighborhood. For example, the 2D object path may be modeled as a local linear combination of several base models according to equation [2]:

$$x^t = [c^1, c^2, \ldots, c^n][m^t, m^t, \ldots, m^t]^T, \quad [2]$$

where (t) is a time-period, the (c)'s mixing coefficients for each of the different local models (m)'s. The number of the different local linear models used for the object path is optimized or otherwise determined using cross-validation methods and systems, for example under optimality criteria such as Akaike Information Criterion (AIC) or Bayesian Information Criterion (BIC). In one aspect, the optimization may provide a trade-off between the number of local linear models used and their respective encoding length.

Initialization of the 3D model at 106 may comprise recognizing a type or behavior of the detected object and selecting an appropriate model that matches the dynamics of the detected object type and/or behavior from a plurality of models. For example, referring again to FIG. 3, recognizing that the detected object 207 is a person may result in selecting a 3D person model 214 from a plurality of other object models, such as vehicles, trucks, dogs, etc. An appropriate type of person model may also be selected from multiple person models, selecting a walking person model based on speed and/or location dynamics of the detected object, or a running person model instead based on a faster speed of movement. Some aspects may distinguish size or other attributes of the detected object to select between different models, for example an automobile 3D model for a vehicle object detected moving along a roadway and having a size dimension larger than a bicycle object and smaller than a truck object. Still other aspects may expect or otherwise focus on only one type of object, and thereby populate any moving object detected within the 2D video data with the same model or type of model. Thus, if the only moving objects expected or of interest in a 2D video environment are people (for example, an assembly area stairwell), then any moving object detected may be populated a person model, omitting the step of distinguishing the object from other object types.

At 110 texture of the 2D object is projected onto the 3D model and the 2D tracks of the object are upgraded to 3D motion to drive the 3D model in dynamic mesh-based 3D by learning a weighted combination of the local linear models that minimizes the image re-projection error of model movement. In one aspect, the mixing coefficients ($m^n$) of equation [2] above are solved for using a least-squares approach, wherein given the mixing coefficients one may express either the 2D motion or the 3D motion of the object as a mixture of 2D or 3D base models, and the location of the 3D model in the world (X) may be updated as a function of time (t) pursuant to equation [3]:

$$X^t = (c^1 * m^1) + (c^2 * m^2) + \ldots + (c^n * m^n) \quad [3]$$

Figure 4:
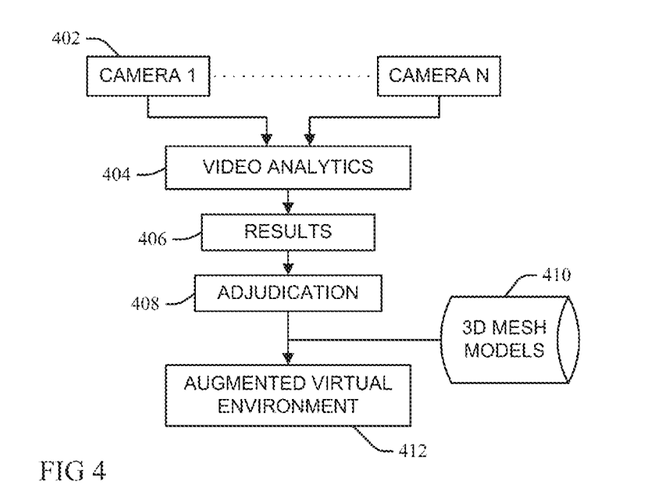
FIG. 4 is a diagrammatic illustration of an implementation of an aspect of the present invention.

FIG. 4 illustrates an implementation of an aspect of the present invention. One or more Cameras 402 provide inputs to a Video Analytics system 404 that analyzes image information in the video inputs to recognize and track object movement within the video images. It will be appreciated that no more than one Camera 402 is required to practice the aspects of the present invention; the 3D modeling environments may be achieved through calibration of only one camera, and do not require multiple cameras or data from other sensors such as range, image and/or object tracking sensors, as is typically required in prior art systems and methods. Results 406 from the analytics that indicate possible object of interest movement and tracking are provided to for Adjudication 408 for review and final determination as to whether an article or motion of interest has in fact been detected and tracked, for example for presentation to a human auditor in a browser or window interface or display. At 410 3D mesh models are initialized and used to populate the tracked objects with appropriate 3D models, for example, a walking person 3D model for an object person detected on a causeway, or an automobile 3D model for a vehicle object detected moving along a roadway and having a size dimension larger than a bicycle object and smaller than a truck object, as discussed generally above with respect to FIGS. 1 through 3. Thus, at 412 a real-time 3D projection of the object from the camera feed into the 3D environment generates an AVE that is both realistic and immersive by using the motion of the 2D object to drive motion of the 3D volumetric-based object model rendered with the texture of the 2D object projected thereon, and within a 3D context.

Achieving an immersive and realistic AVE using 3D modeling may be a computationally challenging task, and aspects of the present invention may utilize a variety of techniques to provide real-time feedback for AVE models. Some aspects decouple components of the process or system of FIG. 1 into offline and online processes. For example, the local linear models for the initialized 3D model at 108 may be learned in an offline stage using training data from motion capture inputs, affording further processing efficiencies. Thus, a library of object models may be constructed during an offline phase at 108 that stores examples of different plausible dynamics for the 3D model, and during runtime a simple library lookup may be performed for a matching dynamics model (for example, a generic vehicle model for a tracked automobile, a generic truck model for a tracked object determined to be a truck, etc.). In this fashion, the high computational costs associated with computing both appropriate dynamics and driving the 3D model at the same time are avoided, as the finding the 3D model dynamics at 108 is reduced to a library lookup, leaving only the texture projection at 110 and optimization at 112 to determine the appropriate weighted combination of the local linear models to be computed online at 112 in real time. The optimization at 112 is convex and may be solved globally, and may be done quickly through an object function based on an image re-projection error minimization process or system, as will be apparent to one skilled in the art.

Base 3D mesh models appropriate for use with aspects of the present invention are learned and built from training data through a variety of processes and systems. Models may be data-driven: for example, a Principal Component Analysis (PCA) may be computed from tracking data collected in 2D to determine data-driven models.

The base models may also be learned from motion-capture data: in one example, base models are learned for walking people objects by collecting many examples of motion capture data of walking from multiple individuals. Procrustes aligning is used to remove translation, rotation and scale differences between the different walking data examples. Then a PCA computation recovers walking factors, wherein a first principal component represents the mean (average) of the data, and second and following components represent varying modes of differentiation for the walking data.

As will be appreciated by one skilled in the art, mesh or wireframe-based 3D geometry models may be created through a wireframe transformation of voxel models of objects. Segmented training data objects may be used to create textured voxel 3D models through reconstruction processes and systems, for example through space-carving and voxel coloring approaches. Imaged surfaces may be treated as locally planar, allowing back projections of images at hypothetical planar patches. Wireframe transformations may start with a marching cubes algorithm, followed by first order neighborhood smoothing and a surface primitive reduction to obtain a low resolution wireframe model.

Aspects of the present invention thus provide for an Augmented Virtual Environment (AVE) that takes in a 3D model of an environment and augments it with a 3D understanding of objects (people or vehicles, etc.) that are contained within the environment. An end-user of the system or process may thus get a complete 3D understanding of the environment being monitored or otherwise represented by 2D video data, enabling the user to place the video feeds within a spatio-temporal context of such an environment. Aspects leverage computer vision technologies to augment the 3D model of an environment with 3D renderings of people and vehicles, etc., within that environment that are both spatially and temporally accurate, which may enable reduction in cognitive overloads of human monitors while at the same time enhancing the visualization quality of the information being gathered.

Figure 5:
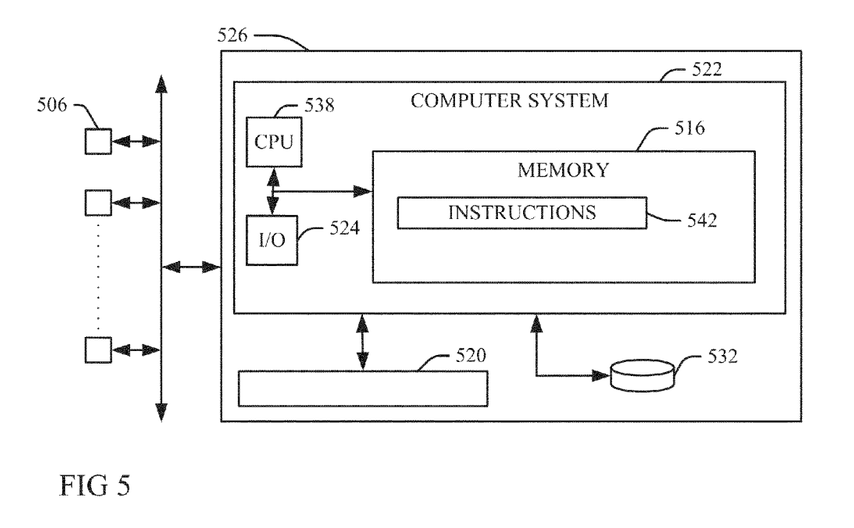
FIG. 5 is a block diagram illustration of a computerized implementation of an aspect of the present invention.

Referring now to FIG. 5, an exemplary computerized implementation of an aspect of the present invention includes a computer or other programmable device 522 in communication with one or more cameras or other imaging devices 506 (for example, video cameras or video servers, etc.). Instructions 542 reside within computer readable code in a computer readable memory 516, or in a computer readable storage system 532, another device 506 or other computer readable storage medium that is accessed through a computer network infrastructure 526 by a processing unit (CPU) 538. Thus, the instructions, when implemented by the processing unit (CPU) 538, cause the processing unit (CPU) 538 to represent objects tracked within 2D video data by 3D modeling as described above with respect to FIGS. 1 through 4.

The computer 522 comprises various components, some of which are illustrated within the computer 522. The processing unit 538 is in communication with one or more external I/O devices/resources 524, storage systems 532 or other devices 520. The processing unit 538 may comprise a single processing unit, or be distributed across one or more processing units in one or more locations, e.g., on a client and server. Similarly, the memory 516 and/or the storage system 532 can comprise any combination of various types of data storage and/or transmission media that reside at one or more physical locations. Further, I/O interfaces 524 can comprise any system for exchanging information with one or more of an external server and/or client (not shown). Still further, it is understood that one or more additional components (e.g., system software, math co-processing unit, etc.), not shown, can be included in the computer 522.

Figure 6:
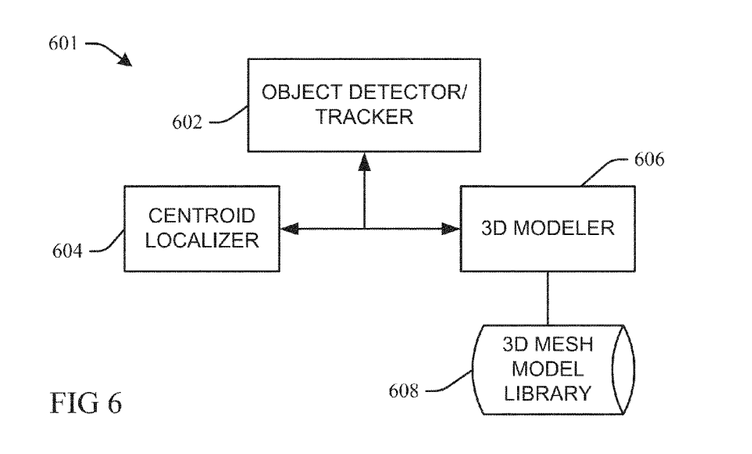
FIG. 6 is a block diagram illustration of an article according to an aspect of the present invention.

FIG. 6 illustrates an article 601 (for example, a programmable device, system, etc.) according to the present invention that represents objects tracked within 2D video data by 3D modeling as described above with respect to FIGS. 1 through 5. One or more of the components of the article 601 are tangible devices that perform specific functions, for example comprising the processing unit 538, the computer readable memory 516 and the computer readable storage medium 532 described above. Thus, as understood by reference to FIGS. 1-5 and the associated description material above, an Object Detector/Tracker 602 detects and tracks movement of an object within a field of view environment of a 2D data feed of a calibrated video camera, the camera calibrated to place the camera within a spatial height, orientation and position context of a 3D model of the environment of the camera field of view. A Centroid Localizer 604 localizes a centroid of the tracked object and determines an intersection with a ground-plane within the field of view environment. A 3D Modeler 606 selects an appropriate model from a 3D Mesh Model Library 608, initializes the selected model within the spatial context of the 3D model by using back-projection, projects a texture of the 2D object onto the 3D model, and determines an appropriate weighted combination of local linear models to drive the 3D model in dynamic mesh-based 3D, and further minimizes image re-projection errors of model movement.

Aspects of the present invention may also perform process steps of the invention on a subscription, advertising, and/or fee basis. That is, a service provider could offer to use discrete matrices of an array of the same image sensors to obtain a plurality of different images at different f-stops from a common exposure as described above with respect to FIGS. 1-6. Thus, the service provider can create, maintain, and support, etc., a computer infrastructure, such as the network computer system 522, network environment 526, and/or the article 601 (or parts thereof) that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computers/devices 522/601, from a computer-readable medium device 516, 520 or 506; (2) adding one or more computing devices to a computer infrastructure; and (3) incorporating and/or modifying one or more existing systems of the computer infrastructure to enable the computer infrastructure to perform the process steps of the invention.

The terminology used herein is for the purpose of describing particular aspects only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The aspect was chosen and described in order to best explain the principles of the invention and the practical application, and to enable others of ordinary skill in the art to understand the invention for various aspects with various modifications as are suited to the particular use contemplated.

What is claimed is:

1. A method for representing objects tracked within two-dimensional video data by three-dimensional models, the method comprising:
   tracking movement of an object detected within a field of view environment of a two-dimensional data feed of a calibrated video camera, wherein the camera is calibrated to a three-dimensional model of the environment of the camera field of view;
   initializing a three-dimensional mesh-based volumetric model appropriate for the tracked object within the spatial context of the three-dimensional model of the environment by using a back-projection of a corresponding two-dimensional image of the tracked object;
   projecting a texture of the two-dimensional object onto the three-dimensional model; and
   upgrading two-dimensional tracks of the object to three-dimensional motion to drive the three-dimensional mesh-based volumetric model.

2. The method of claim 1, further comprising:
   integrating computer-readable program code into a computer system comprising a processing unit, a computer readable memory and a computer readable tangible storage medium, wherein the computer readable program code is embodied on the computer readable tangible storage medium and comprises instructions that, when executed by the processing unit via the computer readable memory, cause the processing unit to perform the steps of tracking the movement of the object detected within the field of view environment of the two-dimensional data feed of the calibrated video camera, initializing the three-dimensional mesh-based volumetric model appropriate for the tracked object within the spatial context of the three-dimensional model of the environment by using the back-projection of the corresponding two-dimensional image of the tracked object, projecting the texture of the two-dimensional object onto the three-dimensional model, and upgrading the two-dimensional tracks of the object to three-dimensional motion to drive the three-dimensional mesh-based volumetric model.

3. The method of claim 1, further comprising:
   calibrating the camera to the three-dimensional model of the environment of the camera field of view by placing the camera within a spatial height, orientation and position context of the three-dimensional model;
   localizing a centroid of the tracked object; and
   determining an intersection of the centroid with a ground-plane within the field of view environment; and
   wherein the step of initializing the three-dimensional mesh-based volumetric model appropriate for the tracked object within the spatial context of the three-dimensional model of the environment comprising using the back-projection of the corresponding two-dimensional image of the tracked object as a function of the centroid and the determined ground-plane intersection.

4. The method of claim 1, further comprising:
   representing nonlinear dynamics of a tracked motion path of the object in the two-dimensional image data as a collection of different local linear models; and
   optimizing a total number of the different local linear models using a cross-validation system; and
   wherein the step of upgrading the two-dimensional tracks of the object to three-dimensional motion to drive the three-dimensional mesh-based volumetric model further comprises learning a weighted combination of the optimized total number of the different local linear models that minimizes an image re-projection error of model movement.

5. The method of claim 4, further comprising:
   solving mixing coefficients for each of the different local linear models using a least-squares approach; and
   updating a location of the three-dimensional model as a function of time and the solved mixing coefficients.

6. The method of claim 5, further comprising:
   learning the different local linear models for the initialized three-dimensional model in an offline stage using training data from motion capture inputs;

constructing a library of a plurality of three-dimensional object models from the learned local linear models for the initialized three-dimensional model, each of the plurality of three-dimensional object models providing a different example of plausible three-dimensional model dynamics; and wherein the step of initializing the three-dimensional mesh-based volumetric model for the tracked object within the spatial context of the three-dimensional model comprises performing a lookup in the constructed library for a matching dynamics model for the two-dimensional tracked object.

7. The method of claim 6, wherein the step of initializing the three-dimensional mesh-based volumetric model for the tracked object within the spatial context of the three-dimensional model further comprises:

recognizing an object type or behavior of the detected two-dimensional tracked object; and selecting the three-dimensional model from the plurality of three-dimensional object models in the library as having dynamics matching the recognized object type or behavior.

8. The method of claim 6, wherein the step of learning the local linear models for the initialized three-dimensional model in the offline stage using training data from motion capture inputs comprises:

collecting a plurality of different learned examples of similar object motions;

removing translation, rotation and scale differences between the different learned examples of similar object motions; and recovering object motion factors through a principal component analysis, wherein a first principal component represents a data mean and second and following components represent varying modes of differentiation for object motion data.

9. The method of claim 8, wherein the step of removing translation, rotation and scale differences between the different learned examples of similar object motions is a Procrustes aligning.

10. A system, comprising:

a processing unit, computer readable memory and a computer readable storage medium;

wherein the processing unit, when executing program instructions stored on the tangible computer-readable storage medium via the computer readable memory:

tracks movement of an object detected within a field of view environment of a two-dimensional data feed of a calibrated video camera, wherein the camera is calibrated to a three-dimensional model of the environment of the camera field of view;

initializes a three-dimensional mesh-based volumetric model appropriate for the tracked object within the spatial context of the three-dimensional model of the environment by using a back-projection of a corresponding two-dimensional image of the tracked object;

projects a texture of the two-dimensional object onto the three-dimensional model; and upgrades two-dimensional tracks of the object to three-dimensional motion to drive the three-dimensional mesh-based volumetric model.

11. The system of claim 10, wherein the processing unit, when executing the program instructions stored on the computer-readable storage medium via the computer readable memory, further:

calibrates the camera to the three-dimensional model of the environment of the camera field of view by placing the camera within a spatial height, orientation and position context of the three-dimensional model;

localizes a centroid of the tracked object;

determines an intersection of the centroid with a ground-plane within the field of view environment; and initializes the three-dimensional mesh-based volumetric model appropriate for the tracked object within the spatial context of the three-dimensional model of the environment by using the back-projection of the corresponding two-dimensional image of the tracked object as a function of the centroid and the determined ground-plane intersection.

12. The system of claim 10, wherein the processing unit, when executing the program instructions stored on the computer-readable storage medium via the computer readable memory, further:

represents nonlinear dynamics of a tracked motion path of the object in the two-dimensional image data as a collection of different local linear models;

optimizes a total number of the different local linear models using a cross-validation system; and upgrades the two-dimensional tracks of the object to three-dimensional motion to drive the three-dimensional mesh-based volumetric model by learning a weighted combination of the optimized total number of the different local linear models that minimizes an image re-projection error of model movement.

13. The system of claim 10, wherein the processing unit, when executing the program instructions stored on the computer-readable storage medium via the computer readable memory, further:

solves mixing coefficients for each of the different local linear models using a least-squares approach; and updates a location of the three-dimensional model of the environment of the camera field of view three-dimensional as a function of time and the solved mixing coefficients.

14. The system of claim 13, wherein the processing unit, when executing the program instructions stored on the computer-readable storage medium via the computer readable memory, further:

learns the different local linear models for the initialized three-dimensional model using training data from motion capture inputs in a stage offline from an online stage used to execute the program instructions stored on the computer-readable storage medium;

constructs a library of a plurality of three-dimensional object models from the learned local linear models for the initialized three-dimensional model, each of the plurality of three-dimensional object models providing a different example of plausible three-dimensional model dynamics; and initializes the three-dimensional mesh-based volumetric model for the tracked object within the spatial context of the three-dimensional model by performing a lookup in the constructed library for a matching dynamics model for the two-dimensional tracked object.

15. The system of claim 14, wherein the processing unit, when executing the program instructions stored on the computer-readable storage medium via the computer readable memory, initializes the three-dimensional mesh-based volumetric model for the tracked object within the spatial context of the three-dimensional model by:

recognizing an object type or behavior of the detected two-dimensional tracked object; and selecting the three-dimensional model from the plurality of three-dimensional object models in the library as having dynamics matching the recognized object type or behavior.

16. The system of claim 14, wherein the processing unit, when executing the program instructions stored on the computer-readable storage medium via the computer readable memory, learns the local linear models for the initialized three-dimensional model in the offline stage using the training data from motion capture inputs by:
collecting a plurality of different learned examples of similar object motions;
removing translation, rotation and scale differences between the different learned examples of similar object motions in a Procrustes aligning; and
recovering object motion factors through a principal component analysis, wherein a first principal component represents a data mean and second and following components represent varying modes of differentiation for object motion data.

17. An article of manufacture, comprising:
a computer readable storage medium having computer readable program code embodied therewith, the computer readable program code comprising instructions that, when executed by a computer processor, cause the computer processor to:
track movement of an object detected within a field of view environment of a two-dimensional data feed of a calibrated video camera, wherein the camera is calibrated to a three-dimensional model of the environment of the camera field of view;
initialize a three-dimensional mesh-based volumetric model appropriate for the tracked object within the spatial context of the three-dimensional model of the environment by using a back-projection of a corresponding two-dimensional image of the tracked object;
project a texture of the two-dimensional object onto the three-dimensional model; and
upgrade two-dimensional tracks of the object to three-dimensional motion to drive the three-dimensional mesh-based volumetric model.

18. The article of manufacture of claim 17, wherein the instructions, when executed by the computer processor, cause the computer processor to:
calibrate the camera to the three-dimensional model of the environment of the camera field of view by placing the camera within a spatial height, orientation and position context of the three-dimensional model;
localize a centroid of the tracked object;
determine an intersection of the centroid with a ground-plane within the field of view environment; and
initialize the three-dimensional mesh-based volumetric model appropriate for the tracked object within the spatial context of the three-dimensional model of the environment by using the back-projection of the corresponding two-dimensional image of the tracked object as a function of the centroid and the determined ground-plane intersection.

19. The article of manufacture of claim 17, wherein the instructions, when executed by the computer processor, cause the computer processor to:
represent nonlinear dynamics of a tracked motion path of the object in the two-dimensional image data as a collection of different local linear models;
optimize a total number of the different local linear models using a cross-validation system; and
upgrade the two-dimensional tracks of the object to three-dimensional motion to drive the three-dimensional mesh-based volumetric model by learning a weighted combination of the optimized total number of the different local linear models that minimizes an image re-projection error of model movement.

20. The article of manufacture of claim 19, wherein the instructions, when executed by the computer processor, further cause the computer processor to:
learn the different local linear models for the initialized three-dimensional model using training data from motion capture inputs in an offline stage;
construct a library of a plurality of three-dimensional object models from the learned local linear models for the initialized three-dimensional model, wherein each of the plurality of three-dimensional object models provide a different example of plausible three-dimensional model dynamics; and
initialize the three-dimensional mesh-based volumetric model for the tracked object within the spatial context of the three-dimensional model by performing a lookup in the constructed library for a matching dynamics model for the two-dimensional tracked object.

* * * * *